(12) United States Patent
Yan

(10) Patent No.: US 6,473,671 B1
(45) Date of Patent: Oct. 29, 2002

(54) 3-D MODELING OF PROTOTYPE GARMENTS

(76) Inventor: He Yan, 2205 New Garden Rd., Apt. 3216, Greensboro, NC (US) 27410

(*) Notice: Subject to any disclaimer, the term of this patent is extended or adjusted under 35 U.S.C. 154(b) by 0 days.

(21) Appl. No.: 09/658,730

(22) Filed: Sep. 11, 2000

(51) Int. Cl.[7] .............................................. G06F 17/50
(52) U.S. Cl. ...................................... 700/134; 700/136
(58) Field of Search .................................. 700/132, 136, 700/128, 134; 705/26, 27; 33/15; 702/155; 112/470.01, 470.05, 475.01, 475.09

(56) References Cited

U.S. PATENT DOCUMENTS

| | | | |
|---|---|---|---|
| 5,930,769 A | 7/1999 | Rose | 705/27 |
| 5,956,525 A | * 9/1999 | Minsky | 33/15 X |
| 5,974,400 A | 10/1999 | Kagami et al. | 705/26 |
| 6,101,424 A | * 8/2000 | Sawada | 700/136 |

OTHER PUBLICATIONS

Article entitled "Try This On for Size" from PC Magazine, pp. 15,17; Dec. 19, 2000.
Mixing the Elements of Mass Customization by Lisa C. Rabon, Bobbin, pp. 38–41, Jan. 2000.
Pre–Production Laying the Cornerstones of Mass Customization Lisa Rabon et al., Bobbin, Dec. 1999.
The Journal of The Textile Institute, Xu et al., vol. 90, 1999 Part 2: Textile Economics, Management & Marketing, pp. 104–120.
3D CAD for Garment Design by Hinds, et al., International Journal of Clothing Science & Technology, vol. 4, No. 4, 1992 pp. 6–14.

* cited by examiner

Primary Examiner—Peter Nerbun
(74) Attorney, Agent, or Firm—Smith Moore LLP (57) ABSTRACT

A computer-aided design and automation system for mass customization. The system includes a 3-D body model and a virtual prototype model. The virtual prototype model includes a close fitting definition, a 3-D library loose fitting definition and texture mapping linked to the close fitting definition and the 3-D library loose fitting definition. The present invention may further include a 2-D spreader model for subsequent cut and sew manufacturing. The 3-D body model may be a dress form, a virtual dress form or a true body dress form created by a body scanner. In the preferred embodiment, the close fitting definition further includes a 3D close fitting definition library. Also, in the preferred embodiment, the 3-D library loose fitting definition is provided by a 2-D to 3-D converter which includes a 2-D pattern converter. In the preferred embodiment, the linked texture mapping is a textile design database, which may be created from a fabric swatch or by textile design.

59 Claims, 5 Drawing Sheets

3-D MODELING OF PROTOTYPE GARMENTS

BACKGROUND OF THE INVENTION (1) Field of the Invention

The present invention relates generally to a computer-aided design and manufacturing and, more particularly, to an apparatus for automation of custom garments for a specific individual's needs.

(2) Description of the Prior Art

Computer automation has played an important role in the apparel industry. For example, it makes mass customization possible in a quick-turn environment. Body scanning is a major component of the automation, which has been studied over the past several years and has met with some success. Body scanning can produce useful information for developing CAD functionality in product development and preproduction, from design conceptualization to marker making.

One of the important applications of body scanning is measurement extraction. Compared to traditional tape measures, measurement extraction provides measurements that are more accurate in a much more efficient way. In addition to obtaining body measurements accurately and efficiently, one also needs to master short-cycle with flexible manufacturing, and provide virtual try-on and digital printing capabilities. Digital printing allows manufacturers to print fabric for individual garments.

These elements of mass customization make it difficult for any attempt to automate the garment designing process. A number of companies in the apparel supply chain have tackled this problem with limited success. Several mass customizing models are currently in use. For example, Brooks Brothers developed an integrated information system, called e-Measure, to allow customers to create and visualize 25 different made-to-measure suit silhouettes in 300 to 500 fabrics. For each new suit order, the body measurements, including the chest, waist and over arm, are taken and entered into the e-Measure system. Only a fixed set of patterns stored in the system can be applied to an individual, although certain standardized alterations are available. A drawback of this system is that it does not match patterns to body scanning. The limited measurements obtained are not sufficient to represent customers'unique size information. As a consequence, more alterations may be needed after the garment is made.

Eastman Machine Co. offered a system using a body scanning technology through a partnership with TELMAT and ScanVec Garment Systems. It created a 3-D image of an individual's body shape from 70 different measurements. It then used the measurement information to modify a pattern and create a cut file that is sent directly to the cutter. A drawback of this system is that it does not provide any 3-D catalog of styles and fabrics for customers'choices.

Gerber Technology Inc. offers the APDS-3D pattern visualization software on its AccuMark systems. APDS-3D is a virtual draping and sampling program that can transfer a 2-D flat pattern to a 3-D virtual dress form. It is now used merely as a visual tool. If the dress form can be created from actual customer body measurements, it is possible for the system to be further developed as a tool to test fitting results. In addition, the design is limited to close fitting styles.

Currently there are two ways of generating slopers. First, patternmakers draft on hard paper and later enter the block (i.e. sloper) using a digitizer that converts the hard pattern into a computerized format. Second, patterinmakers can use a pattern design system (PDS) to draft the sloper on the computer. The problem with both methods is that drafting is very time consuming, therefore only a few slopers are made for standard size target customers.

Patternmakers now make changes in the pattern or sloper through CAD software on-screen using standard flat patternmaking techniques, including dart manipulations, add fullness, etc. This is also very time consuming. In addition, the fitting result cannot be seen until the patterns are cut and sewn into prototype garments, which would be tried on a real model. Finally, the process of making a prototype garment is expensive and time consuming, too.

Thus, there remains a need for a new and improved apparatus and method for automation of custom garments for a specific individual's needs, which creates a virtual prototype model of the garment using a 3-D library database with sloper information created from formulas of generating different slopers thereby allowing the designer to generate the sloper automatically, and where the pattern style information (i.e. pattern generating process) is used to generate the pattern database for a customer's individual body measurements.

SUMMARY OF THE INVENTION

The present invention is directed to a computer-aided design and automation of mass customization. The system includes a 3-D body model and a virtual prototype model. The virtual prototype model includes a close fitting defintion a 3-D library loose fitting definition and texture mapping linked to the close fitting definition and the 3-D library loose fitting definition.

The present invention may further include a 2-D spreader model for subsequent manufacturing. The 2-D spreader model may further include a sloper generator, a pattern generator, and a grading generator. The grading generator may further include a sizing system. The grading generator may be manual entry or include an automatic grading database. A marker maker may be added for subsequent cutting and sewing.

The 3-D body model may be a conventional dress form or a virtual dress form. The virtual dress form may be computer generated from a statistical database. The 3-D body model may also be a true body dress form created by a body scanner.

In the preferred embodiment, the close fitting definition further includes a 3-D close fitting definition library. Also, in the preferred embodiment, the 3-D library loose fitting definitionis created by a 2-D to 3-D converter. The 2-D to 3-D converter may further include a 2-D pattern converter. The 2-D pattern converter includes a 2-D sloper database and a pattern database, which may be created using the book *Patternmaking for Fashion Design,* by Helen J. Armstrong, as a reference.

In the preferred embodiment, the 3-D library loose fitting definition is a computer model generated wire grid or a picture database including a picture converter and a 3-D draping database. In the preferred embodiment, the 3-D draping database can be created using the book *Draping for Apparel Design,* also by Helen J. Armstrong, as a reference. Both books are hereby incorporated by reference in their entirety. In the preferred embodiment, the linked texture mapping is a textile design database, which may be created from a fabric swatch or by textile design.

Accordingly, one aspect of the present invention is to provide a system for a computer-aided design and automation of mass customization. The system includes a 3-D body model, and a virtual prototype model, the virtual prototype model including a close fitting definition and a 3-D library loose fitting definition.

Another aspect of the present invention is to provide a virtual prototype model for a system for 3-D computer-aided design and automation of mass customization. The virtual prototype model includes: a close fitting definition, a 3-D library loose fitting definition, and texture mapping linked to the close fitting definition and the 3-D library loose fitting definition.

Still another aspect of the present invention is to provide a system for a computer-aided design and automation of mass customization. The system includes: a 3-D body model, and a virtual prototype model, the virtual prototype model including a close fitting definition; a 3-D library loose fitting definition and texture mapping linked to the close fitting definitions and the 3-D library loose fitting definition; and a 2-D spreader model.

These and other aspects of the present invention will become apparent to those skilled in the art after a reading of the following description of the preferred embodiment when considered with the drawings.

DESCRIPTION OF THE PREFERRED EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
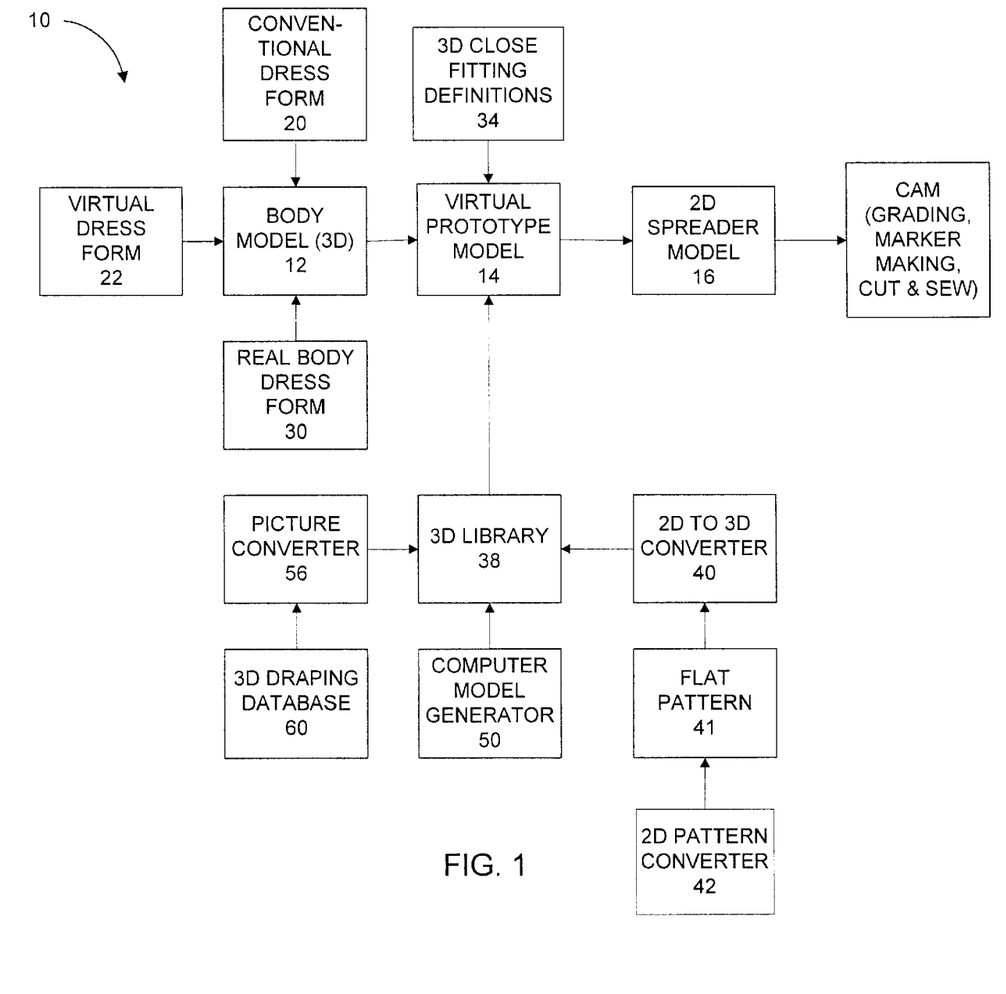
FIG. 1 is an overall schematic of a system for 3-D computer-aided apparel designs.

As best seen in FIG. 1, a system for 3-D computer-aided apparel design, generally designated 10, is shown constructed according to the present invention. The system 10 includes three primary components: a 3-D body model 12, a virtual prototype model 14 with pattern information, and a 2-D spreader model 16. Output from the 2-D spreader model 16 may be used for grading, markermaking, cutting and sewing a finished garment, as will be described in more detail later.

Figure 3:
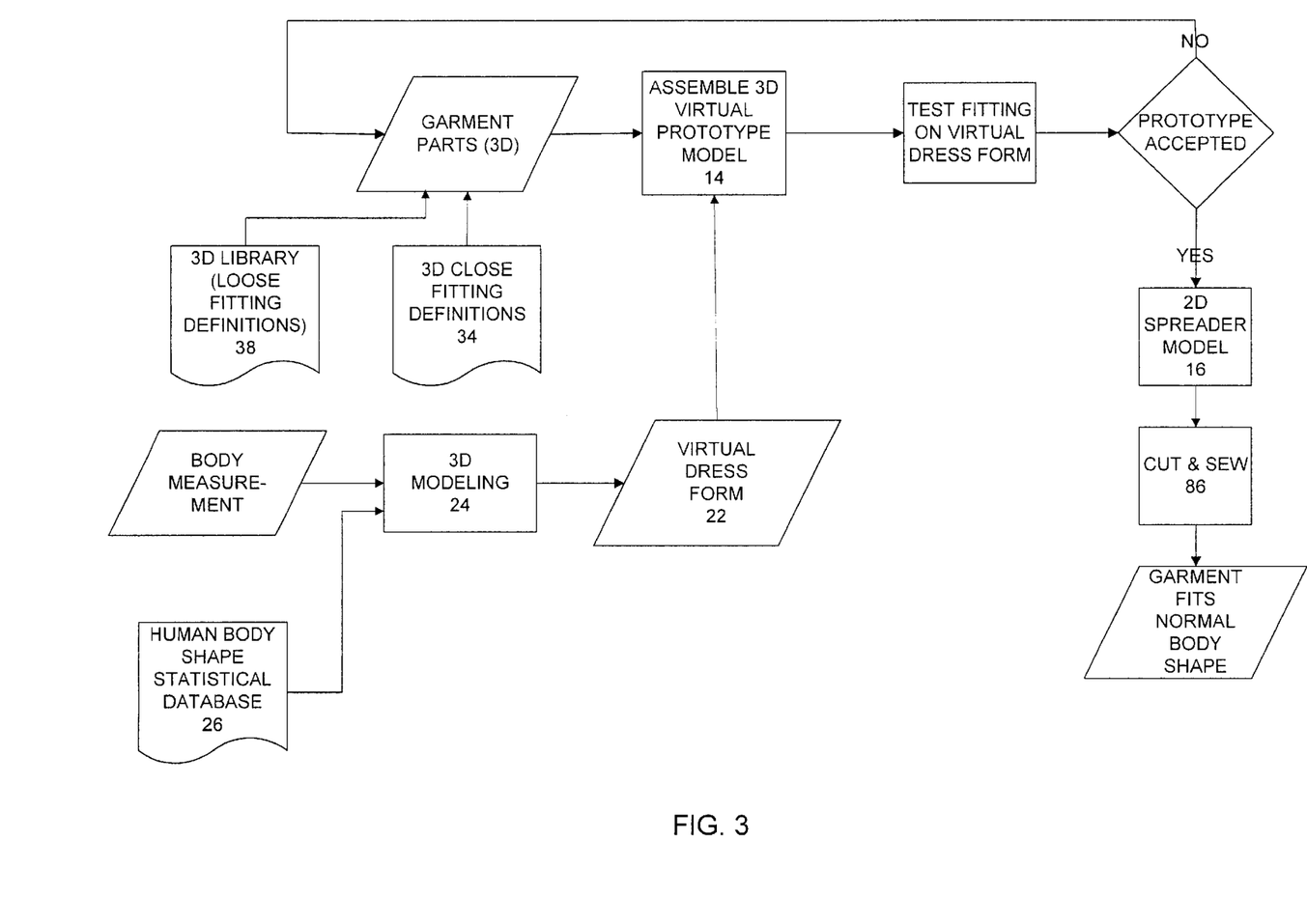
FIG. 3 illustrates simulation of draping using a virtual dress form.
Figure 4:
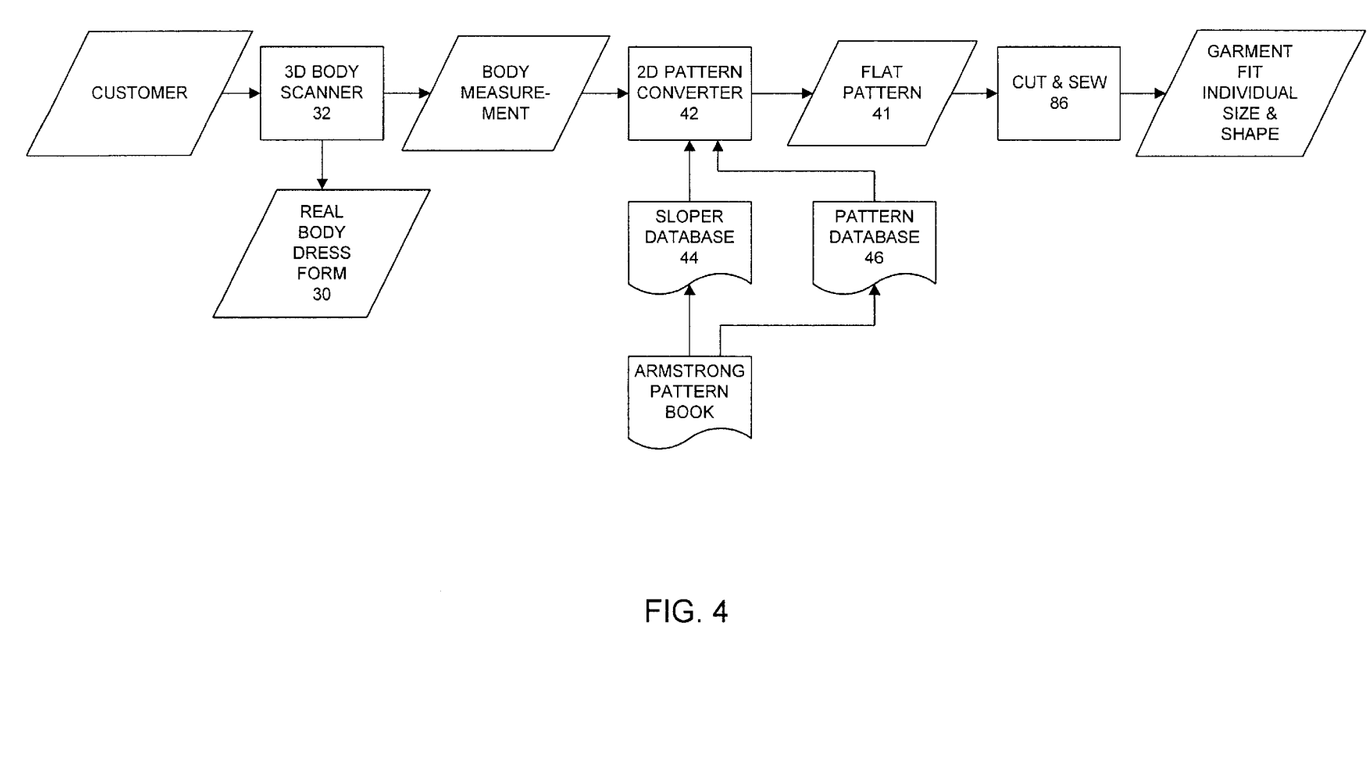
FIG. 4 illustrates simulation of draping using a true body dress form.

3-D body model 12 may receive input from a conventional dress form 20 (see FIG. 2); a virtual dress form 22 (see FIG. 3); or a true body dress form 30 (see FIG. 4). The output of the 3-D body model 12 is sent and creates the virtual prototype 14. Virtual prototype 14 receives the pattern design information from either 3-D close fitting definitions 34 or 3-D library loose fitting definitions 38, as best seen in FIG. 3. The close fitting definitions define the degree to which a garment drapes or fits closley to the body. Similarly, the loose fitting definitions define the degree to which a garment fits loosely on the body.

3-D library loose fitting definitions 38 is processed by the 2-D pattern converter 42 into a flat pattern 41 and then converted into the 3-D garment part by the 2-D to 3-D converter 40. In addition, 3-D library loose fitting definitions may also be generated by computer model 50. Finally, 3-D library loose fitting definitions may also be obtained by using 3-D draping database 60 to create 3-D pictures, which can be passed through a picture converter 56 to generate picture database 54 which provides data for texture mapping to the 3-D library loose fitting definitions 38. While the 3-D pictures could be produced by 3-D scanning of the garments, most designs are usually distributed in a 2-D format. In addition, having front and back views normally should be sufficient to convey the design concept and allow a 3-D garment to be simulated.

The output of the virtual prototype, which shows a simulation of the design on a 3-D body model, may also be sent to the 2-D spreader model 16. The 2-D spreader model 16 can then generate patterns which can be used to produce a unique garment, create grading for a multiplicity of garments and finally, even to create and manufacture many different sizes or many different numbers of the same garment.

As can be appreciated, the virtual prototype 14 of the present invention not only includes a visual representation, but also includes both the pattern information unique to the garment and the individual that the garment is sized for.

This pattern information can then be used to generate the pattern pieces to fit individual body size and shape, so the customer does not have to go to the department store to buy those commercial patterns or take a lot of time to do the alterations. Instead, they will get the pattern that will fit their individual body shape and size directly.

Figure 2:
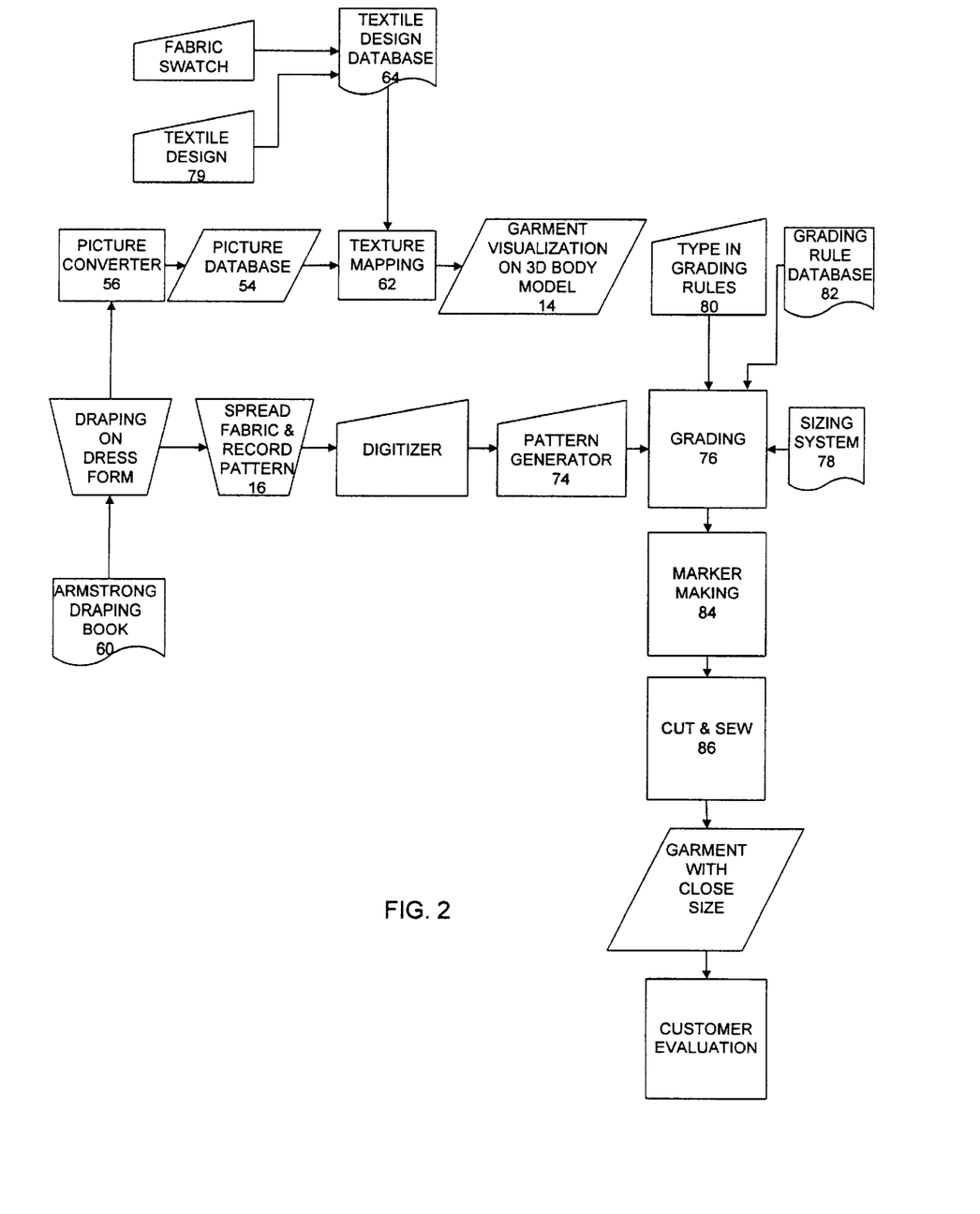
FIG. 2 illustrates simulation of draping with a conventional dress form and forming the pattern.

Turning to FIG. 2, there is shown a simulation of draping with the conventional dress form and forming the pattern. In this conventional way, a designer would first drape the design on a dress form, for example, using the Armstrong Draping book. The designer, once it is draped on the dress form, may take pictures of the garment from different angles using a 3-D scanner to simulate a 3-D result. Picture converter 56 generates a 3-D picture database 54, which may provide data for subsequent texture mapping 62. Texture mapping is usually from a textile design database 64, which may be created either by using a fabric swatch 66, or a textile design program 70. Texture mapping 62 is used to generate the 3-D simulation of the virtual prototype model 14.

The actual forming of the pattern is done from the draping on the dress form by spreading the fabric record pattern information 16. A digitizer may then be used to create the pattern generator 74, which may include adding seam allowance or transferring darts. This pattern information may, in the preferred embodiment, go through a grading generator 76. Grading generator 76 may either use manual entry 80 of typing in the grading rules, or may use an automatic grading base 82. The grading generator further includes a sizing system 78, which are rules by which various sizes of a particular pattern are adjusted. Once the output of the grading generator can, in the preferred embodiment, go directly to a marker maker 84, it can be received by a cut and sew operator 86 to complete a custom garment.

In this process, the garment, because it is based on the conventional dress form, fits in the normal body shape. After the grading process, it is produced as a different size of the garment, but it is based on the sizing system of the individual company.

FIG. 3 illustrates a simulation of draping using a virtual dress form. In this method, the designer first inputs certain known body measurements. 3-D modeling 24 then creates a virtual dress form 22 for a normal human body, male or female, with these measurements and statistical database 26. This data is inputted, along with the 3-D garment parts, from the 3-D library 38 and 3-D close fitting definition 34 to create the virtual prototype model 14.

In the preferred embodiment, an additional step of test fitting of the virtual prototype includes checking sleeve fitting on the arm holes; the bodice fitting on the neckline; the skirt fitting on the waist; and the front, back, and side views to verify that the virtual prototype is fitted properly. If the test fitting is not met, the 3-D garment parts are recreated and tested again on the virtual prototype model 14.

Once a virtual prototype is acceptable, it may go to the 2-D spreader model, such as discussed in FIG. 2, for final cut and sew. However, if the 3-D garment part is generated from the 2-D pattern, it is already flat and does not need to be spread again. On the other hand, the system shown in FIG. 3 started with body measurements and statistical database for human body shape, through 3-D modeling algorithms, a virtual dress form is generated. Since the virtual dress form is based on the statistics of the human body shape, it represents the "normal" body shape. How accurately it represents an individual body, depends on how many measurements are entered.

Turning now to FIG. 4, there is illustrated a simulation of draping using a true body dress form. In this embodiment, a customer is first passed through a 3-D body scanner 32. The 3-D body scanner may produce an actual 3-D dress form of an individual size and shape 30. In addition, specific body measurements are sent to the 2-D pattern converter 42. Pattern converter 42 receives input from sloper database 44 and receives input from pattern database 46, and may further include input from the Armstrong patternmaking book. This data is used to produce the flat pattern design 41. In the prior art method, the sloper is first drafted and is put on hard paper, and then later digitized to be used over-and-over again to produce the flat pattern design method based on the Armstrong patternmaking book. However, in the present invention, a sloper database is used to create this information for the 2-D pattern converter 42, which saves substantial time. After the 2-D pattern is generated, the pattern may, such as discussed in FIG. 2, go to a conventional cut and sew operation 86 to produce a garment of that individual size.

In the past, manufactures have had to enter the sloper input data into the computer first and then manipulate the information into the pattern piece. In the present invention, the pattern database allows the designer to input the manipulation procedure information, so they save time on pattern generation (i.e. transfer dart, add seam allowance, or to add fullness, etc).

Figure 5:
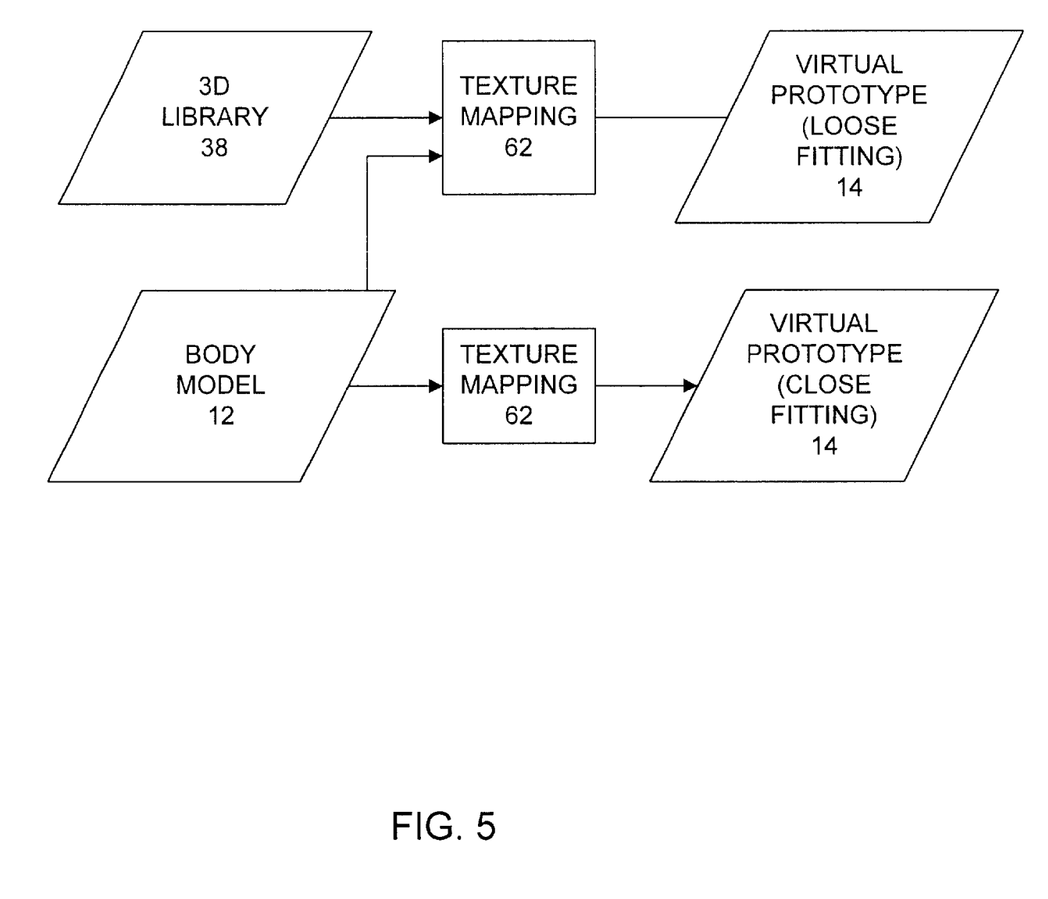
FIG. 5 illustrates texture mapping of the virtual prototype model.

FIG. 5 illustrates texture mapping on the virtual prototype model 14. In the preferred embodiment, this is begun with a body model 12. The close fitting style for the simulation can then can go through the texture mapping of the dress form by texture mapping 62 directly on the body model 12 to produce the close fitting style virtual prototype 14. For the loose fitting style, the design is generated from the 3-D loose fitting library 38, is texture mapped and is fitted on the body model 12 to produce the loose fitting style virtual prototype 14.

In operation, formulas of generating different slopers are used to create a sloper database. When the customer's individual body measurement information is entered, the computer will generate the sloper database automatically. In the preferred embodiment, style information (i.e. pattern generating process) is used to generate a pattern database.

Thus, the designer can simply retrieve the style from the database and change some parameters if necessary. The 3-D library of the present invention may be used to provide thousands of styles for a designer or customer to choose. The designer can also add their own design to the library.

For the visual result, the present invention can be used to combine real pictures of draping results, 3-D computer modeling technique and texture mapping to generate 3-D virtual prototype garments. At the same time, the present invention can "spread" and record 2-D pattern information. When a designer retrieves certain styles from the 3-D library, they get pattern information as well.

Designers and customers can use the system constructed according to the present invention from a distance. For example, customers can get their body measurement information through a body scanner. The information can be saved on disk or smart card and sent to a designer or manufacturer via the Internet. Customers can choose the style, color, and fabric they prefer to fit his/her individual body shape. Eventually, they can see themselves wearing the garment of their choice on the screen from different angles, under different light sources, with different backgrounds.

Certain modifications and improvements will occur to those skilled in the art upon a reading of the foregoing description. It should be understood that all such modifications and improvements have been deleted herein for the sake of conciseness and readability but are properly within the scope of the following claims.

I claim:

1. A system for a computer-aided design and automation of mass customization, said system comprising:
   (a) 3-D body model; and
   (b) a virtual prototype model, said virtual prototype model including a close fitting definition that defines a degree to which a garment fits closely to a body and a 3-D library loose fitting definition that defines a degree to which a garment fits loosely on a body.

2. The system according to claim 1, further including a 2-D spreader model.

3. The system according to claim 2, further including a sloper generator.

4. The system according to claim 3, further including a pattern generator.

5. The system according to claim 4, further including a grading generator.

6. The system according to claim 5, wherein said grading generator further includes a sizing system.

7. The system according to claim 5, wherein said grading generator is manual entry.

8. The system according to claim 5, wherein said grading generator includes an automatic grading database.

9. The system according to claim 5, further including a marker maker.

10. The system according to claim 9, further including a cut and sew operator.

11. The system according to claim 1, wherein said 3-D body model is a dress form.

12. The system according to claim 1, wherein said 3-D body model is a virtual dress form.

13. The system according to claim 12, wherein said virtual dress form is computer generated.

14. The system according to claim 13, wherein said computer generated virtual dress form is generated from a statistical database.

15. The system according to claim 1, wherein said 3-D body model is a true body dress form created by a body scanner.

16. A virtual prototype model for a system for 3-D compute-raided design and automation of mass customization, said virtual prototype model comprising:
(a) a close fitting definition that defines a degree to which a garment fits closely to a body;
(b) a 3-D library loose fitting definition that defines a degree to which a garment fits loosely on a body; and
(c) texture mapping linked to said close fitting definition and said 3-D library loose fitting definition.

17. The system according to claim 16, wherein said close fitting definition further includes a 3-D close fitting definition library.

18. The system according to claim 17, wherein said 3-D close fitting definition library is a database.

19. The system according to claim 16, wherein said 3-D library loose fitting definition is provided by a 2-D to 3-D converter.

20. The system according to claim 19, wherein said 2-D to 3-D converter further includes a 2-D pattern converter.

21. The system according to claim 20, wherein said 2-D pattern converter includes a 2-D sloper database and a pattern database.

22. The system according to claim 16, wherein said 3-D library loose fitting definition is a computer model generator.

23. The system according to claim 22, wherein said computer model generator is a wire model grid.

24. The system according to claim 16, wherein said 3-D library loose fitting definition is a picture database.

25. The system according to claim 24, wherein said picture database further includes a picture converter.

26. The system according to claim 25, wherein said picture converter further includes a 3-D draping database.

27. The system according to claim 16, wherein said linked texture mapping is a textile design database.

28. The system according to claim 27, wherein said textile design database is created from a fabric swatch.

29. The system according to claim 27, wherein said textile design database is created by textile design.

30. A system for a computer-aided design and automation of mass customization, said system comprising:
(a) a 3-D body model; and
(b) a virtual prototype model, said virtual prototype model including a close fitting definition that defines a degree to which a garment fits closely to a body; a 3-D library loose fitting definition that defines a degree to which a garment fits loosely on a body and texture mapping linked to said close fitting definition and said 3-D library loose fitting definition; and
(c) a 2-D spreader model.

31. The system according to claim 30, further including a sloper generator.

32. The system according to claim 31, further including a pattern generator.

33. The system according to claim 32, further including a grading generator.

34. The system according to claim 33, wherein said grading generator further includes a sizing system.

35. The system according to claim 33, wherein said grading generator is manual entry type.

36. The system according to claim 33, wherein said grading generator includes an automatic grading database.

37. The system according to claim 33, further including a marker maker.

38. The system according to claim 37, further including a cut and sew operator.

39. The system according to claim 30, wherein said 3-D body model is a dress form.

40. The system according to claim 30, wherein said 3-D body model is a virtual dress form.

41. The system according to claim 40, wherein said virtual dress form is computer generated.

42. The system according to claim 41, wherein said computer generated virtual dress form is generated from a statistical database.

43. The system according to claim 30, wherein said 3-D body model is a true body dress form created by a body scanner.

44. The system according to claim 30, wherein said close fitting definition further includes a 3-D close fitting definition library.

45. The system according to claim 45, wherein said 3-D close fitting definition library is a database.

46. The system according to claim 30, wherein said 3-D library loose fitting definition is provided by a 2-D to 3-D converter.

47. The system according to claim 46, wherein said 2-D to 3-D converter further includes a 2-D pattern converter.

48. The system according to claim 47, wherein said 2-D pattern converter includes a 2-D sloper database and a pattern database.

49. The system according to claim 30, wherein said 3-D library loose fitting definition is a computer model generator.

50. The system according to claim 49, wherein said computer model generator is a wire model grid.

51. The system according to claim 30, wherein said 3-D library loose fitting definition is a picture database.

52. The system according to claim 51, wherein said picture database further includes a picture converter.

53. The system according to claim 52, wherein said picture converter further includes a 3-D draping database.

54. The system according to claim 30, wherein said linked texture mapping is a textile design database.

55. The system according to claim 54, wherein said textile design database is created from a fabric swatch.

56. The system according to claim 54, wherein said textile design database is created by textile design.

57. A method for computer-aided design and automation of mass customization, said method comprising the steps of:
(a) providing a 3-D body model; and
(b) providing a virtual prototype model to fit said 3-D body model, said virtual prototype model including a close fitting definition that defines a degree to which a garment fits closely to a body and a 3-D library loose fitting definition that defines a degree to which a garment fits loosely on a body.

58. A method for providing a virtual prototype model for a system for 3-D computer-aided design and automation of mass customization, said method comprising the steps of:
(a) providing a close fitting definition that defines a degree to which a garment fits closely to a body;
(b) providing a 3-D library loose fitting definition that defines a degree to which a garment fits loosely on a body; and
(c) linking texture mapping to said close fitting definition and said 3-D library loose fitting definition.

59. A method for a computer-aided design and automation of mass customization, said method comprising the steps of:
(a) providing a 3-D body model; and
(b) providing a virtual prototype model to fit said 3-D body model, said virtual prototype model including a close fitting definition that defines a degree to which a garment fits closely to a body; a 3-D library loose fitting definition that defines a degree to which a garment fits loosely on a body and texture mapping linked to said close fitting definition and said 3-D library loose fitting definition; and (c) using said virtual prototype model to create a 2-D spreader model.

* * * * *